United States Patent [19]

McNeal

[11] Patent Number: 4,818,310
[45] Date of Patent: Apr. 4, 1989

[54] PRESSURIZED CABLE SPLICE CLOSURE APPARATUS AND METHOD

[75] Inventor: Thomas E. McNeal, Hanceville, Ala.

[73] Assignee: Bell South Corporation, Atlanta, Ga.

[21] Appl. No.: 47,025

[22] Filed: May 5, 1987

[51] Int. Cl.⁴ .......................................... H01B 13/06
[52] U.S. Cl. ...................................... 156/48; 156/49; 156/52; 156/56; 174/23 R; 174/76; 174/88 R
[58] Field of Search ..................... 156/48, 49, 52, 56; 174/23 R, 76, 88 R

[56] References Cited

U.S. PATENT DOCUMENTS

| 3,203,544 | 8/1965 | Gilbert | 206/47 |
|---|---|---|---|
| 3,361,605 | 1/1968 | Gilbert | 156/48 |
| 3,419,669 | 12/1968 | Dienes | 174/84 |
| 3,455,336 | 7/1969 | Ellis | 138/156 |
| 3,879,249 | 4/1975 | Filreis et al. | 156/215 |
| 3,895,180 | 7/1975 | Plummer | 174/92 |
| 3,919,460 | 11/1975 | Neail et al. | 174/87 |
| 3,944,183 | 3/1976 | Miller | 254/104 |
| 3,992,569 | 11/1976 | Hankins et al. | 174/92 |
| 4,070,746 | 1/1978 | Evans et al. | 29/450 |
| 4,135,553 | 1/1979 | Evans et al. | 138/141 |
| 4,298,641 | 11/1981 | Boettcher | 428/36 |
| 4,466,843 | 8/1984 | Shimirak | 156/48 |
| 4,500,371 | 2/1985 | DeGroot | 156/48 |
| 4,511,415 | 4/1985 | Dienes | 156/48 |
| 4,545,830 | 10/1985 | Dienes et al. | 156/48 |
| 4,686,327 | 8/1987 | Debbaut et al. | 156/48 X |
| 4,736,071 | 4/1988 | Hawkins et al. | 156/49 X |

OTHER PUBLICATIONS

Bell System Practices, Section 633-506-201, Issue 5, 1981, 2-Type Closure-Description and Installation.
AMP Handbook HB5397 Rev., B Universal Closures Description and Installation, 1983, pp. 14-20.
3M Brochure, K&B Vault and Riser Closures, 1980, pp. 3-5, 14, 15.
Preformed Line Products Company, Application Procedure Preformed Splice Case, 1977.

Primary Examiner—Robert A. Dawson
Attorney, Agent, or Firm—Jones, Askew & Lunsford

[57] ABSTRACT

A method and apparatus for enclosing a splice joining at least first and second cable segments prevents water from entering the splice. The apparatus includes a flexible reservoir sealingly attachable to a sealing surface of an end plate assembly. The end plate assembly is sealingly attachable to the cable segments. The pressurized splice closure sections sealingly engage one another and the end plates. The method includes forming a reservoir about the splice, sealing the reservoir to the first and second conductor segments or to the end plates, forming an opening in the reservoir, pouring a curable encapsulant into the reservoir, working the encapsulant into intersitices between the conductors in the cable segments, sealing the reservoir, enclosing the reservoir in a splice closure and pressurizing the splice closure. This method combines a curable encapsulant such as a two-part polyurethane with a pressurized closure such as a 2-type, gas pressurized closure.

19 Claims, 4 Drawing Sheets

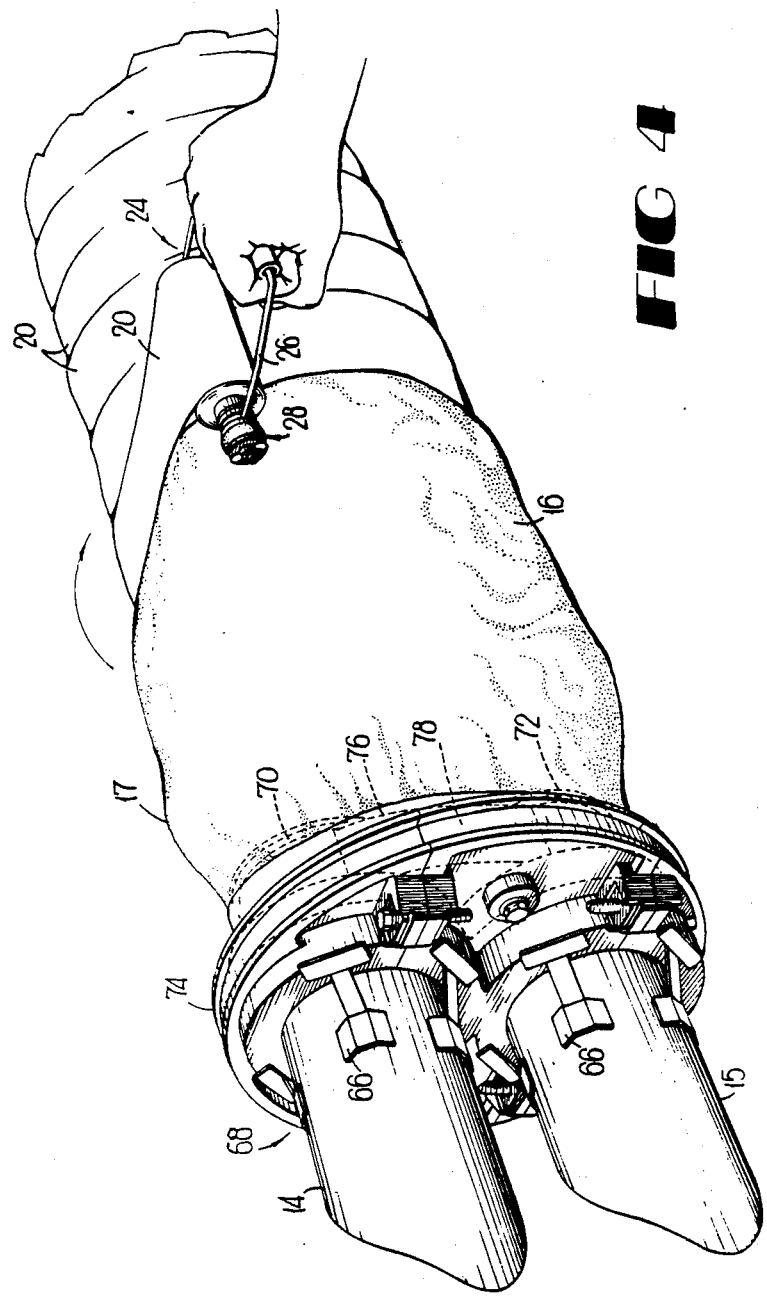

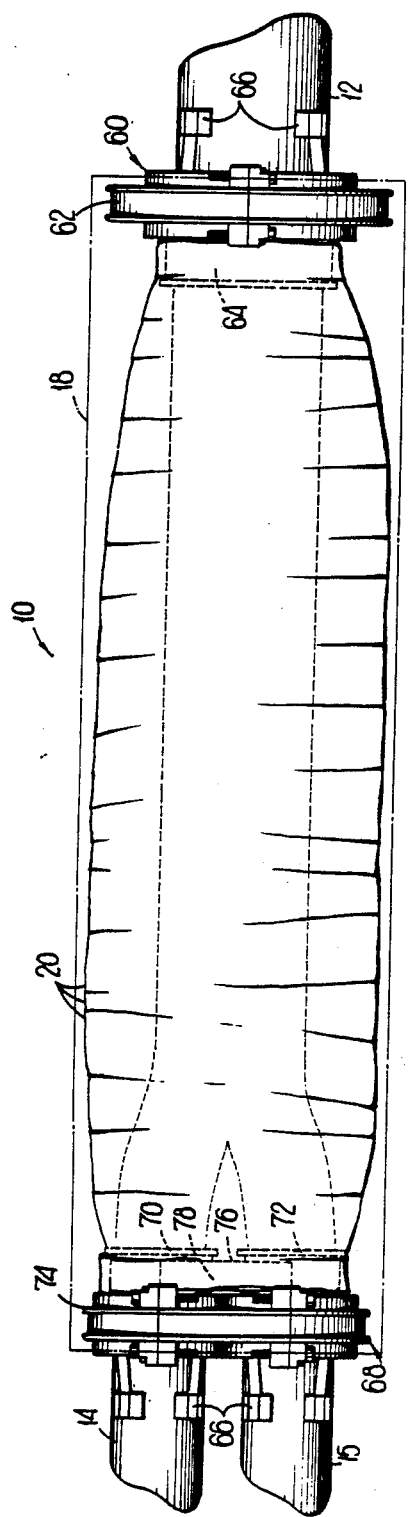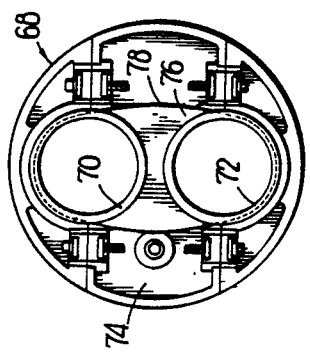

PRESSURIZED CABLE SPLICE CLOSURE APPARATUS AND METHOD

TECHNICAL FIELD

This invention pertains to cable splices and more particularly to a method and apparatus for enclosing a cable splice and protecting the splice from water entering the splice area from the environment and from water migrating through the cable.

BACKGROUND ART

Multi-conductor cables, such as telephone communications cables for example, are spliced together to serve a particular function. Each splice is a potential location where water may enter the cable, causing a deterioration in the service provided by the cable. Water presents a severe problem, not only for the splice joint but for cables in general. Steps taken to protect cables from moisture include pressurizing the cable with nitrogen or air to prevent water from entering. The conductors in a multiconductor cable do not completely fill the space within the cable sheath and the compressed gas occupies the spaces or interstices inside the cable sheath between the conductors. The pressurized gas escapes through any break occurring in the sheath, preventing water from entering. Obviously, a splice for a gas pressurized cable must be both gas tight and water tight.

Other cables, known as filled cables, have a filling compound such as a grease based or petroleum jelly to fill the interstices in the cable. Any water entering a filled cable must displace the fill. One advantage a gas pressurized cable has over a filled cable is that a break in the sheath is immediately detectable before water has a chance to enter, because of a drop in the pressure of the compressed gas. The pressure drop is easily detected with pressure monitoring equipment. Filled cables, on the other hand, have no early warning or detection mechanism and extra care must be taken to ensure that the splices are sealed from moisture. Obviously, a splice for a filled cable only needs to be water tight. Accordingly, cable splice closure methods and apparatus for filled cables are different from cable splice methods and apparatus for gas pressurized cables.

A grease filled cable assembly for protecting a cable splice against the environment is disclosed in U.S. Pat. No. 3,895,180. The cable splice assembly includes an inner cover and an outer jacket placed about the splice. The space between the inner cover and the outer jacket is filled with a liquid foam material which expands and hardens. The inner cover is injection filled with a grease based or petroleum jelly. U.S. Pat. No. 4,466,843 discloses a method for protecting a splice in a grease filled cable which includes forming a reservoir about the splice, filling the reservoir with a curable liquid sealant, and compressing the reservoir to force the liquid sealant to penetrate into the interstices between the individual wires of the splice bundle. The method also includes maintaining the pressure until the sealant cures, U.S. Pat. No. 4,511,415 discloses a method of sealing an electrical cable which includes forming a reservoir around the splice area, pouring an encapsulant into the reservoir and sealably covering the reservoir. While all of these cable splicing methods afford a certain level of protection against the entrance of water, none provides a level of protection commensurate with the current need to hold back a water pressure head of twenty feet or more.

A water pressure head, or simply water head, is the difference in elevation between two points in a body of water and the resulting pressure of the water at the lower point is expressible as this height. Thus, a 20-foot water head refers to the pressure exerted on the bottom of a column of water twenty feet high. Water is particularly troublesome for underground cables and buried cables because the cables and splices are exposed to water acting through a water head. Water finding its way to a break in a cable sheath typically acts through a water head of several feet and has the impetus to find its way to vulnerable splices.

Conventional splice closures were typically designed to protect the cable from a water head of approximately ten feet, which is two feet greater than the eight feet typically recommended by specifications. In practice, a pressure of 1 psi on the splice holds back a water head of two feet, so that a pressure of 6 psi is required to hold back a 12-foot water head. To achieve the 6 psi, some conventional splice closure methods covered the reservoir with a sealing tape applied in a stretched condition to pressurize the encapsulant in the splice area. The tape was applied without tools but had built-in distortion gauges giving an indication of the amount of stretch of the tape indicating pressure. The tape was often stretched, giving an indication of a specific pressure but inadvertently applied at a different pressure. Accordingly, it will be appreciated that it would be highly desirable to provide a cable splice apparatus and method for applying the tape at a uniform pressure.

Even when the tape was applied with a predetermined stretch developing a predetermined pressure on the encapsulant, the pressure dropped when the encapsulant cured. This pressure drop occurred because the uncured encapsulant was a pressure transmitting liquid whereas the cured encapsulant was a nonpressure transmitting solid. Measurements indicate the pressure dropped by about one half.

For the high pair-count cables typically encountered in communications networks, a closure is used to cover and protect the splice. The closure is filled with an encapsulant material. Such a closure requires a relatively large volume of expensive encapsulant. Accordingly, it is highly desirable to have a splice closure which uses a minimal amount of expensive encapsulant to protect the splice from the entrance of water.

Space is limited in most underground applications, especially in cable vaults. Splice closures have definite minimum space requirements depending upon the pair count and diameter of the cables involved. To accommodate cable retention clamps and to facilitate bending or twisting of the cables, the length of a splice closure is increased. It will be appreciated that it would be highly desirable to have a splice closure with the shortest possible length to reduce the minimum space requirement for a cable of a given diameter and pair count.

SUMMARY OF THE INVENTION

The present invention is directed to overcoming the problems set forth above. Briefly summarized, a method and apparatus for enclosing a splice joining at least first and second cable segments prevents water from entering the splice. The apparatus includes a flexible reservoir sealingly attachable to a sealing surface of an end plate assembly. The end plate assembly is sealingly attachable to the cable segments. The pressurized closure sections sealingly engage one another and the end plates. The method includes forming a reservoir about the splice, sealing the reservoir to the first and second conductor segments or to the end plates, forming an opening in the reservoir, pouring a curable encapsulant into the reservoir, working the encapsulant into interstices between conductors in the cable segments, sealing the reservoir, enclosing the reservoir in a splice closure and pressurizing the splice closure. This method combines a curable encapsulant such as a two-part polyurethane with a pressurized closure such as a reenterable, 2-type, gas pressurized closure.

It is an object of the invention to provide a protective splice closure to prevent water from entering the splice. It is a feature of this invention that the foregoing object is accomplished by a method comprising forming a reservoir about the splice, filling the splice with a curable liquid sealant and sealing the reservoir. The sealed reservoir is enclosed in a splice closure pressurized to hold back water. An advantage provided by this feature of the splice closure system is effective protection against water heads of twenty feet or more.

It is an object of the invention to provide an effective cable splice closure system for multiconductor cables which uses less liquid encapsulant for high pair count cables and large diameter cables than has heretofore been used. It is a feature of this invention that this object is accomplished by providing a reservoir having a relatively small volume to hold the encapsulant with the remaining volume of the closure filled with compressed gas. An advantage provided by this feature is a reduction in the amount of encapsulant used and the reduced cost.

It is an object of the invention to provide a splice closure which is physically compatible with the space limitations in cable vaults and the like. It is a feature of this invention that this object is accomplished by modifying the end plates to facilitate shortening the splice closure thereby lowering the space requirements of the splice closure. An advantage provided by this feature of the invention is the ability to accommodate higher pair count and larger diameter cables in the same limited space.

Another object of the invention is to provide a splice closure method and apparatus which can be retrofitted to existing splices. It is a feature of this invention that this object is accomplished by sealing a reservoir about the splice and pressurizing a closure. The advantage provided by this feature is an increase in protection for existing splices against a water head of twenty feet or more instead of only eight to ten feet.

BRIEF DESCRIPTION OF THE DRAWINGS

FIG. 4 is a diagrammatic perspective view of another preferred embodiment of a cable splice closure apparatus similar to FIG. 1 wherein two multiconductor cable segments enter one end of the splice closure through an end plate assembly and are joined in a splice bundle with wrapping tape applied over the reservoir.

FIG.5 is a diagrammatic side elevational view of the preferred embodiment of the cable splice closure apparatus of FIG. 4 further illustrating the cable transition area and cable retention clamps.

FIG. 6 is an inside view of the left end plate assembly of the cable splice closure apparatus illustrated in FIGS. 4 and 5.

DETAILED DESCRIPTION OF THE PREFERRED EMBODIMENTS

Figure 1:
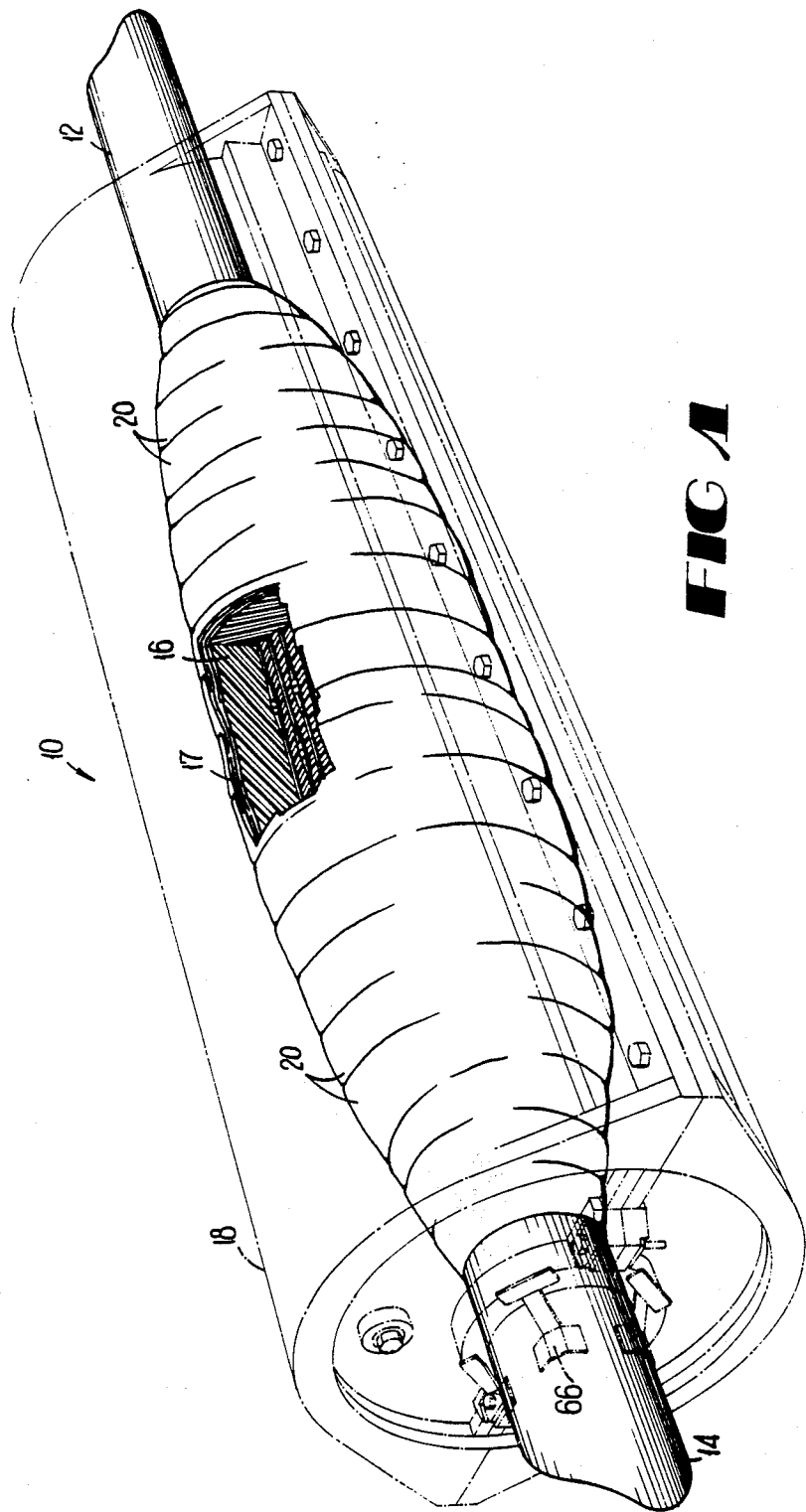
FIG. 1 is a diagrammatic perspective view of a preferred embodiment of a cable splice closure apparatus constructed and assembled in accordance with the present invention showing the two closure members in phantom with the tape having a section cut away revealing the reservoir and splice bundle.

Referring to FIG. 1, a splice 10 joins first and second cable segments 12 and 14. The cable segments 12, 14 are preferably segments of a filled cable which are joined to perform a particular function, such as telephone communications, for example. While both cable segments 12, 14 are filled, they do not necessarily share a common diameter or a common pair count. It is normal practice to splice a low pair count cable serving a particular business or residential area to a high pair count, main feeder cable serving a larger area to thereby connect the small area to the main area. This practice conserves resources because the higher pair count cable is not needlessly routed when a lower pair count, less expensive cable can be used.

Because the cable segments 12, 14 are filled segments, any water entering the cable segments must displace the fill in the cable segments 12, 14 before entering the area around the splice 10. It is not unusual for cables to encounter difficulty with water because the cables are buried in the ground in a conduit network or oftentimes buried bare in the ground. The shifting of the earth or the incidental contact with the conduit or any of a number of other occurrences can cause scratches, scrapes and breaks in the cable sheath which is the outer covering of a multiconductor cable. It will be appreciated by those familiar with buried cables that even a small hole exposes the conductors inside the cable to moisture. Water seeks these openings and is forced inside the cable by the head pressure. The head pressure develops because the cable is below the surface of the earth, and water finding its way into the earth acts on the cable through a distance at least as great as the depth at which the cable is buried. Many specifications call for splices which can withstand the pressure of a water head of eight feet. Water entering the cable will eventually find its way to the splice area 10 because it remains under the head pressure. Water entering the cable through cuts or breaks in the cable sheath can infiltrate the splice area of the cable, causing short circuits and cross talk between conductor pairs in the cable.

The present invention provides a method for preventing water from infiltrating the splice 10 joining the first and second multiconductor cable segments 12, 14. The method comprises the steps of forming a reservoir 16 about the splice, sealing the reservoir 16 to the first and second multiconductor cable segments 12, 14, and forming an opening in the reservoir 16. The method further includes pouring a curable encapsulant into the reservoir 16 through the opening in the reservoir, working the encapsulant into the interstices between conductors in the first and second multiconductor cable segments 12, 14, sealing the reservoir 16, enclosing the reservoir 16 in a splice closure 18 and pressurizing the splice closure 18.

Still referring to FIG. 1, the individual conductors are joined, as is customary, forming an electrical path between conductors in the two cable segments 12, 14. When all of the connections are made, a flexible sheet 17 of material is used to form the reservoir 16 about the splice area 10. The function of the reservoir 16 is to receive a liquid encapsulant and hold the encapsulant in close proximity to the conductors in the splice area. The reservoir also permits pressure from a compressed gas to be transmitted to the encapsulant to prevent the encapsulant from retreating from the spaces between the individual conductors and other interstices in the splice area and inside the cable sheath.

Encapsulants are well known in the art and materials suited for this application include two-part polyurethane systems including a polyurethane polymer and a curing agent or hardener. As with other two-part sealers, the curing rate depends upon the proportion of hardener used. The proportion of hardener used should be sufficient to enable the encapsulant to be liquid and flowable in the uncured state but curable to a non-flowable condition. The encapsulant is introduced through the opening in the reservoir 16 and is worked, using the hands or some vibratory means or mechanism, to remove air bubbles and to urge the encapsulant into the interstices between conductors in the cables. It can be appreciated that a delicate balance must be achieved between the flow rate of the encapsulant and its curing time. Ordinarily, encapsulants set up within about a day, but such encapsulants must be used with pressure wrapped tape. One such tape 20 is composed of a thin strip of polypropylene which is capable of stretching several times its original length. The tape pressurizes the encapsulant when the tape attempts to return its original dimensions.

While the best mode of the present invention contemplates the use of wrapping tape, the use of such tape is not mandatory. The tape is an expedient means for supporting the flexible reservoir and the liquid encapsulant, giving the reservoir shape and definition while protecting the reservoir from puncture until the final protective closure is applied. The tape facilitates the use of a thin, inexpensive, flexible, easily used reservoir.

Preferably at least one layer of tape is applied around the reservoir 16 sealing the encapsulant in the reservoir 16. The tape is preferably applied at a uniform pressure sufficient for preventing retrenchment of the encapsulant from the interstices. A pressure of about one or two psi is sufficient for the purpose because the cable is not pressurized and the encapsulant needs only minimal urging. The encapsulant preferably enters the interstices by flowing therein unaided, or perhaps by being urged with the fingers.

Figure 2:
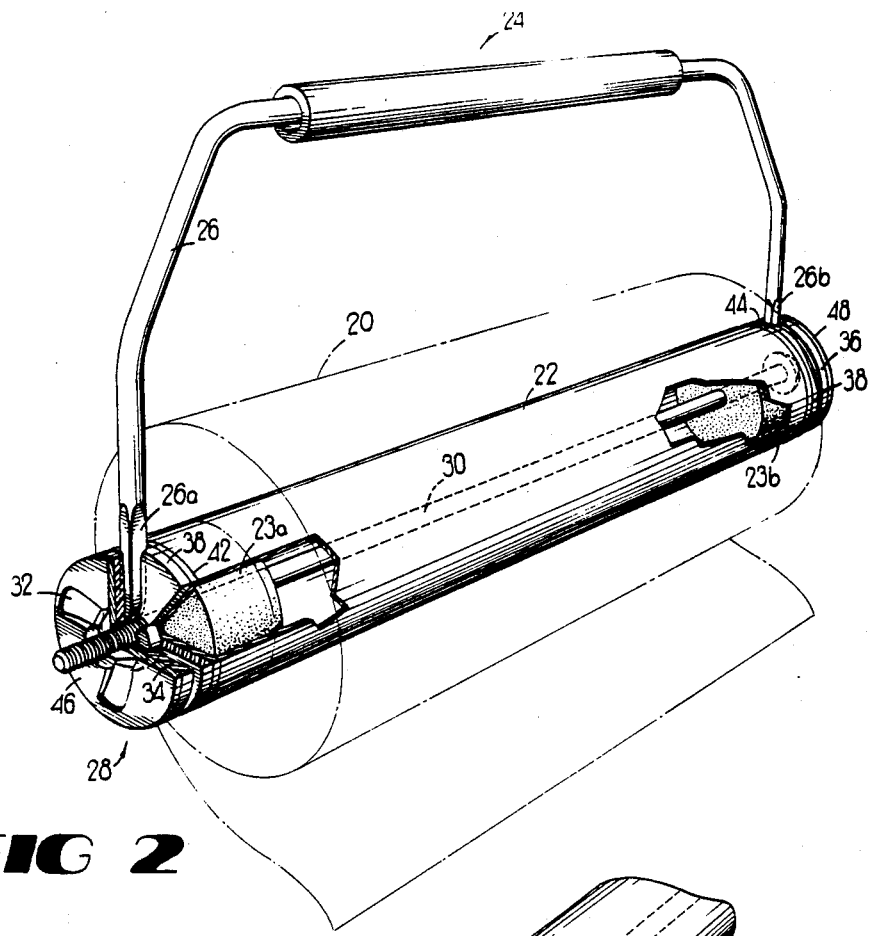
FIG. 2 is a perspective view of a preferred embodiment of a dispenser for tape for wrapping the resrevoir of FIG. 1 shown with the wrapping tape in phantom and with sections cut away to reveal the structure and composition of the dispenser.

Referring to FIG. 2, the pressure wrap tape 20 preferably comes mounted on a tube 22 constructed of cardboard or the like. The tape roll 22 is attached to a dispenser 24 having a handle assembly 26 and a connecting assembly 28 for connecting the handle assembly 26 and pressure wrap roll 22. Preferably, the connecting assembly 28 includes a bolt 30 extending through openings in the handle assembly and through the center of the pressure wrap roll 22. The bolt 30 is preferably kept centered in the hollow tube 22 by the use of spacers, such as rubber spacers 23a, 23b inserted in the tube 22. Of course, the tube 22 could be hollow with an opening therethrough, but a hollow tube is very satisfactory and quite inexpensive. A wing nut 32 attaches to the threaded end of the bolt 30 and is useful for varying the freedom with which the roll 22 rotates between the ends of the handle assembly 26.

Figure 3:
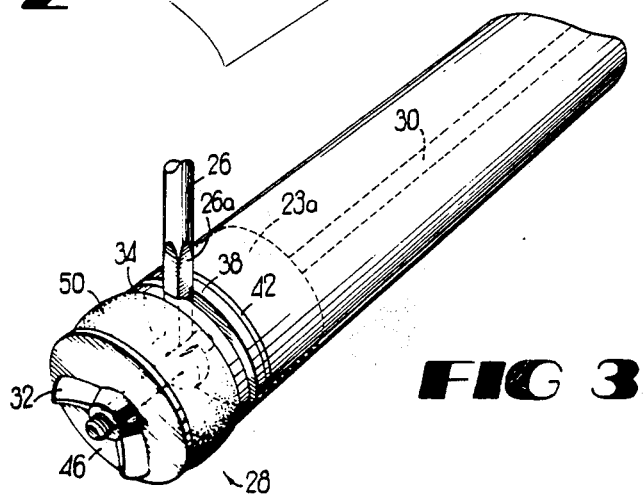
FIG. 3 is a perspective view similar to FIG. 2 of another preferred embodiment of a dispenser wherein a compressible friction member is formed of a rubber or elastomeric material.

It has been found advantageous to place a deformable spacer on either side of the end portions 26a and 26b of the handle assembly 26. These deformable spacers 34, 36, 38, 40 can be made of leather, plastic, or other friction material conformable to the ends of the handle, to grip the handle tightly while allowing relative movement between selected ones of the spaces 38, 40 and washers 42, 44 positioned adjacent the ends of the tube 22. Washers 46, 48 are positioned outside of the outermost of the spacers 34, 36. To compensate for variations in the length of the roll 22, an adjusting element, such as compression washer 50, can be inserted between the washer 46 and spacer 34 (FIG. 3) The washer 50 is preferably constructed of an elastomeric material, such as rubber for example. Alternatively, the compression member 50 can be inserted between washer 48 and spacer 36. Also, the compression washer 50 can replace one or more of the spacers, 34, 36, 38, 40.

In operation, the dispenser 24 dispenses the pressure wrap 20 at a predetermined stretch or pressure, making it convenient to apply the pressure wrap tape at a uniform pressure. The amount of stretch of the pressure wrap is dependent upon the freedom of movement existing between the handle assembly 26 and the tape roll 22. The amount of freedom is determined by the tightness of the nut 32 compressing rubber washer 50 to maintain a uniform force on the assembly. The dispenser 24 is ideally constructed of simple, readily available, inexpensive components. While the tape dispenser 24 has been described in connection with the drawing figures, it should be evident from the foregoing description that certain aspects of the pressure wrap dispenser 24 are not limited to the particular details of the example illustrated and it is contemplated that other modifications or applications will occur to those skilled in the art.

Referring to FIG. 1, the splice closure 18 is typically placed over the reservoir 16 while the encapsulant is still in the uncured condition. Curing is a process which may take a couple of days. As the encapsulant cures, it is possible for its position to change so that retrenchment of the encapsulant from the interstices is possible. To prevent retrenchment from occurring, the closure 18 is pressurized to a pressure sufficient for preventing the encapsulant from retreating from the interstices. This pressure acts on the encapsulant through the reservoir and through any tape applied over the reservoir. It is possible for the tape to relax, for the reservoir to relax, or for the encapsulant to shift or move around until it cures. Such shifting or moving upsets any pressure balance obtained with the reservoir or with the combination of the reservoir and the tape. The pressurized closure ensures the pressure is uniform over the encapsulant. It is easily seen that the enclosure system is not dependent upon the use of the tape at all. The pressurized closure system works best with the tape, but the tape is not necessary to pressurize the encapsulant. The closure 18 is preferably pressurized to a pressure of at least 10 psi, which is sufficient to hold back a 20 foot water head. The 10 psi pressure is uniform over the encapsulant, even after the encapsulant cures, to always hold back the 20-foot water head. Tests conducted with the closure pressurized to 15 psi successfully held back a 30-foot water head.

The combination of the urethane encapsulant and the pressurized closure is used with filled cable splices for underground and buried cable applications. This system maintains constant pressure on the urethane encapsulant in the liquid state and in the cured state to prevent moisture from entering the splice closure 18. This system can replace other systems used today for large volume splices, such as gravity delivered encapsulated vessels. This new system uses less than one-half of the encapsulant as a gravity delivered encapsulated vessel and will prevent a 20 foot and greater water head down the cable core. Perhaps for the first time, high pair count splices for filled cables can be placed in underground and buried plants and remain protected from moisture entering the splice point.

Referring to FIG. 4, quite often a cable splice will involve more than two cable segments. These segments may have the same pair count and diameter or they may be of varying pair counts and diameters. When two or more cables enter the same end of a splice enclosure, allowance must be made for bending the cables and for the installation of cable clamps to secure the closure apparatus to the cable. The present invention quite handily disposes of these two problems. The present invention places the cable clamping apparatus outside the closure freeing space inside the closure. The space normally occupied by the cable clamps can be used for other purposes. The absence of the cable clamps creates more space inside for the splice bundle. Positioning the cable clamps outside of the splice closure allows the reservoir 16 to be attached to the end plate assemblies.

Referring to FIGS. 4–6, a splice closure 18 encloses the first, second and third cable segments 12, 14, 15. A first end plate assembly 60 is sealingly attached to the first cable segment 12. The first end plate assembly 60 includes an end plate 62 which has a blocking spool 64 extending from the end plate 62 toward the splice 10. The cable clamps 66 are attached to the end plate 62 but are positioned on the opposite side of the end plate 62 outside the splice closure 18. Placing the cable clamps 66 outside of the closure 18 and utilizing the blocking spool 64 allow smaller closures to be used. Also, larger diameter and higher pair count cables can be spliced in the same space formerly restricted to lower pair count and smaller diameter cables. Moving the clamps 66 outside of the closure 18 saves about four inches or more of space by shortening the length of the closure required.

The second end plate assembly 68 is sealingly attached to the second and third cable segments 14, 15. The second end plate assembly 68 includes at least first and second blocking spools 70, 72 extending from the end plate 74 toward the splice area, and a crutch plug 76 positioned between the first and second blocking spools 70, 72 forming an end plate assembly attachment surface 78. In the example illustrated there are two cables segments 14, 15 entering the left end of the splice closure 18 requiring two blocking spools 70, 72 to accommodate the two entering cables. The number of blocking spools per end plate is equal to the number of cables entering the closure through the end plate. The reservoir 16 is now formed by sealingly attaching the flexible reservoir 16 to the blocking spool 64 of the first end plate 62 and to the attachment surface 78 of the second end plate 74. Once the reservoir 16 is formed, the invention works as set forth above.

It is to be understood that the advantages gained by using the blocking spools and crush plugs and by placing the retention clamps outside of the closure can reduce the closure length on the average by about eight inches or more and reduces the amount of encapsulant required. The present invention shortens the required space by the amount of cable required to be left intact inside the closure to accommodate the cable retention clamps 66 and cable transition. This is easily eight inches or more for high pair count cables.

It will now be appreciated that there has been presented a pressurized splice closure apparatus 18 and method which requires less space for cables of a given diameter and pair count. This is attributable to the use of the blocking spools 64, 70, 72 inside the closure and the moving of the retention clamps 66 outside of the closure, thereby allowing the amount of intact cable inside the closure 18 to be reduced and reducing the length of the closure 18. It will also be appreciated that this reservoir filled splice closure system uses far less encapsulant than conventional, completely filled closures. This encapsulant reduction is accomplished while protecting the splice area from the entrance of water at greater head pressure than heretofore possible.

The protection against the entrance of water is greatly improved over the prior art systems capable of holding back a water head of, perhaps, as much as twelve feet. The present invention has been tested and found capable of holding back a 30-foot water head. The present invention has been tested and rated to continually hold back a 20-foot water head. The ability to continually hold back a 20-foot water head is attributable to the combination of the urethane encapsulant used with a pressurized closure well known in the art, such as a 2-type pressurized closure. The closure is pressurized while the encapsulant is uncured, thereby uniformly pressurizing the encapsulant which keeps the encapsulant from retreating from the interstices in the cable where it seals against moisture. The encapsulant is urged into the interstices by massaging with the hands or by using a thinner composition which requires very little, if any, urging to penetrate the interstices. When desired, the pressure wrap tape can be used. Even though not needed to pressurize the encapsulant, it is anticipated the pressure wrap tape will be desired to add strength to the reservoir to protect it against puncture. The dispenser allows the tape to be applied at a uniform stretch or pressure, so that the encapsulate is more evenly distributed and cures in a fairly uniform condition. The pressure wrap provides the ability to shape the splice. Because the closure uses compressed gas, a change in the state of the encapsulant from a liquid to its cured more solid state does not affect the pressure. That is, the gas pressure acting on the encapsulant remains the same while the encapsulant cures, so that there is no change in the presure exerted on the encapsulant as it changes from liquid to solid. This constant pressure prevents the encapsulant from retrenching from the interstices in the cable and helps form an effective seal to prevent the infiltration of water.

While the invention has been described with reference to the preferred embodiments, it will be understood by those skilled in the art that various changes may be made and equivalents may be substituted for elements of the preferred embodiments without departing from the invention. In addition, many modifications may be made to adapt a particular situation and material to the teachings of the invention without departing from the essential teachings of the present invention. For example, a filled cable and an air core cable may be spliced without departing from the present invention. In such a situation, the splice is protected by depressurizing the air core cable before introducing the encapsulant. One encapsulant composition can be used to produce deep penetration into the interstices and another composition can be used to fill the main volume of the reservoir. By this method, the reservoir can be filled and sealed allowing the air core cable to be immediately pressurized.

As will be evident from the foregoing description, certain aspsects of the invention are not limited to the particular details of the examples illustrated, and it is therefore contemplated that other modifications or applications will occur to those skilled in the art. It is accordingly intended that the claims shall cover all such modifications and applicatios as do not depart from the true spirit and scope of the invention.

What is claimed is:

1. A method for preventing water from infiltrating a splice joining first and second multiconductor cable segments, comprising:
   forming a reservoir about the splice;
   sealing said reservoir to the first and second multiconductor cable segments;
   forming an opening in said reservoir;
   pouring a curable encapsulant into said reservoir through said opening;
   working said encapsulant into interstices between conductors in the first and second multiconductor cable segments;
   sealing said reservoir;
   enclosing said reservoir in a splice closure; and
   injecting a compressed gas into said splice closure and pressurizing said splice closure.

2. A method according to claim 1 wherein working said encapsulant includes removing air bubbles.

3. A method according to claim 1 wherein said encapsulant is liquid and flowable into the interstices in the uncured state and is not flowable in the cured state.

4. A method according to claim 1 wherein working said encapsulant includes kneading said encapsulant and urging said encapsulant into the interstices.

5. A method according to claim 1 further comprising wrapping at least one layer of tape around said reservoir sealing the encapsulant in said reservoir.

6. A method according to claim 5 including applying the tape at a uniform pressure.

7. A method according to claim 5 including dispensing the tape from a roll of tape mounted on a dispenser and setting the pressure at which the tape is dispensed.

8. A method according to claim 1 including pressurizing said splice closure to a pressure sufficient for preventing retrenchment of the encapsulant from the interstices.

9. A method according to claim 1 including pressurizing said splice closure to a pressure sufficient for forcing the encapsulant into the interstices.

10. A method according to claim 1 including pressurizing said splice closure to at least 10 psi.

11. A method according to claim 1 including pressurizing said splice closure to a pressure sufficient for holding back a 20-foot water head.

12. A method according to claim 1 including pressurizing said splice closure to a pressure sufficient for holding back a 30-foot water head.

13. A method for preventing water from infiltrating a splice joining first and second cable segments in a multi-conductor cable, comprising:
   sealingly attaching first and second end plate assemblies to the first and second cable segments, respectively, each of said end plate assemblies including an end plate having at least one blocking spool extending from the end plate toward the splice;
   forming a reservoir about the splice;
   sealing said reservoir to the blocking spools of the first and second end plate assemblies;
   forming an opening in said reservoir between said blocking spools;
   pouring a curable encapsulant into said reservoir through said opening;
   working said encapsulant into interstices between conductors in the cable;
   sealing said reservoir,
   attaching a splice closure to said first and second end plates enclosing said reservoir in said splice closure;
   pressurizing said splice closure with a compressed gas thereby compressing said reservoir and pressurizing said encapsulant; and
   curing said encapsulant thereby forming a water impenetrable seal.

14. A method according to claim 13 including mounting retention clamps outside said splice closure.

15. A method for preventing water from infiltrating a splice joining first, second and third cable segments in a multiconductor cable, comprising:
   sealingly attaching a first end plate assembly to said first cable segment, said first end plate assembly including an end plate having a blocking spool extending from the end plate toward the splice;
   sealingly attaching a second end plate assembly to said second and third cable segments, said second end plate assembly including at least first and second blocking spools extending from the end plate toward the splice and a crutch plug positioned between the first and second blocking spools forming an end plate assembly attachment surface;
   forming a reservoir about the splice;
   sealing said reservoir to the blocking spool of the first end plate assembly and to the attachment surface of the second end plate;
   forming an opening in said reservoir;
   pouring a curable encapsulant into said reservoir through said opening;
   working said encapsulant into interstices between conductors in the cable;
   sealing said reservoir;
   enclosing said reservoir in a splice closure;
   pressurizing said splice closure with a compressed gas compressing said reservoir and pressurizing said encapsulant; and
   curing said encapsulant thereby forming a water impenetrable seal.

16. A method according to claim 15 including mounting retention clamps outside said splice closure.

17. A method for preventing water from infiltrating a splice joining first and second cable segments in a multiconductor cable, each cable segment having an outer sheath, comprising the steps of:
   forming a reservoir about the splice;
   sealing said reservoir to the outer sheaths of the first and second cable segments;
   forming an opening in said reservoir;
   pouring a curable encapsulant into said reservoir through said opening;

working said encapsulant into interstices between conductors in the cable;

closing said reservoir;

wrapping at least one layer of tape around said reservoir;

enclosing said reservoir in a splice closure;

pressurizing said splice closure with a compressed gas thereby compressing said reservoir and pressurizing said encapsulant;

curing said encapsulant thereby forming a water impenetrable seal.

18. An apparatus for preventing water from infiltrating a splice joining first, second and third multiconductor cable segments, comprising:

a first end plate assembly sealingly attachable to the first cable segment, said first end plate assembly including an end plate having at least one blocking spool extending therefrom toward the splice;

a second end plate assembly sealingly attachable to the second and third cable segments, said second end plate assembly including an end plate having at least two blocking spools extending therefrom toward the splice and a crutch plug positioned between the first and second blocking spools forming an end plate assembly attachment surface;

a reservoir sealingly attachable to the blocking spools of the first and second end plate assemblies for receiving a curable encapsulant; and a splice closure attachable to said first and second end plate assemblies enclosing said reservoir therewithin, in response to being gas pressurized, said splice closure compressing said reservoir and pressurizing said encapsulant whereby said cured encapsulant forms a water impenetrable seal.

19. An apparatus according to claim 18 wherein said reservoir is attachable to said end plate assembly attachment surface.

* * * * *